: 3,207,577
METHOD FOR THE RECOVERY OF COPPER FROM A SLURRY CONTAINING THE SAME

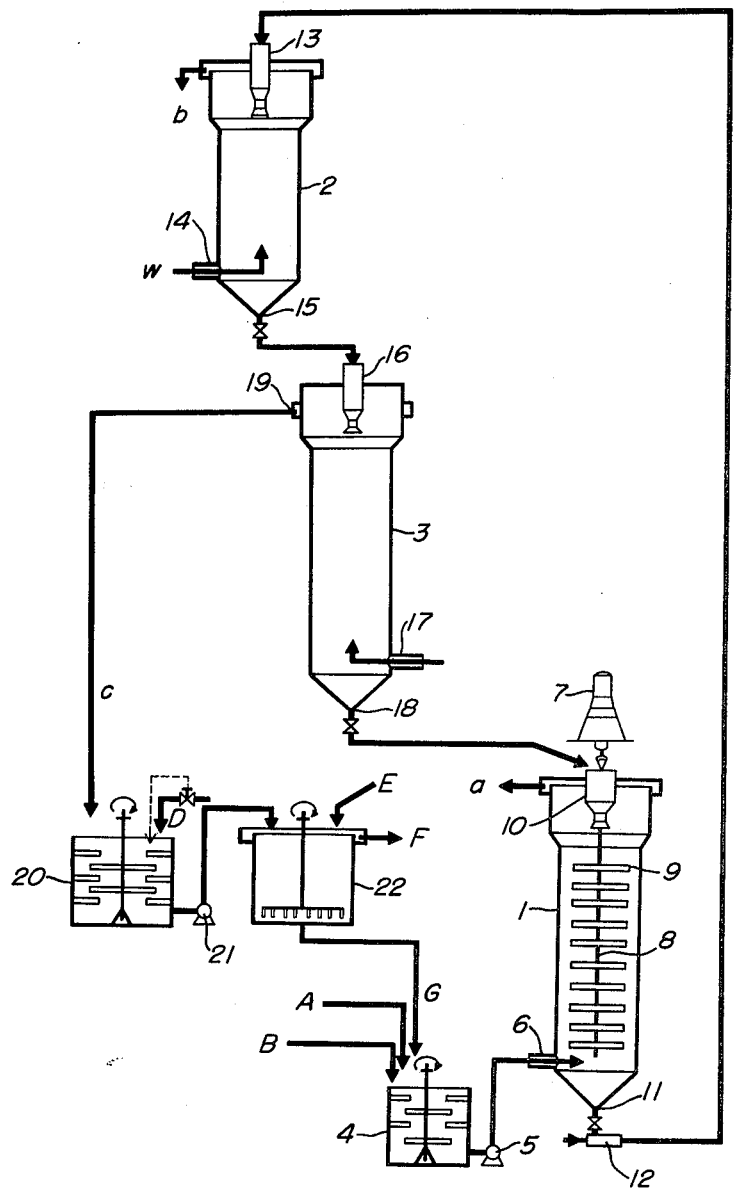

Noriaki Mizuma, Nobeoka-shi, Japan, assignor to Asahi Kasei Kogyo Kabushiki Kaisha, Kita-ku, Osaka, Japan, a corporation of Japan
Filed June 22, 1961, Ser. No. 118,801
Claims priority, application Japan, Feb. 11, 1961, 36/3,978
1 Claim. (Cl. 23—125)

This invention relates to a method for the recovery of metallic ion from a slurry containing the same. More particularly, this invention relates to a method for the continuous recovery of metal ion from a slurry containing the same by using an ion exchange apparatus.

In order to recover a slight amount of metal ion contained in a slurry, two methods have been proposed heretofore, one of which comprises completely dissolving the metal ion by the addition of a suitable solvent to said slurry, filtering the slurry and then precipitating the metal ion from the thus obtained filtrate, and the other of which comprises settling a sludge from the slurry and separating the settled sludgy material from a metal ion-containing solution from which the metal ion is recovered. In the former method, however, filtration of the precipitate would require a filter aid to be used, if said precipitate is in compressive form. Moreover, a considerably large filtration area would be necessitated. In the latter method, on the other hand, when the ratio of the sludgy material to the metal ion-containing solution in the original slurry is high, the recovery of this solution will naturally be limited. Although the recovery rate of the metal ion-containing solution can be increased by repeating counter-current extraction of the slurry, the metal ion concentration of the recovered extract will be much lower. Furthermore, if the free sedimentation velocity of the sludge is low, a correspondingly great settling area will be required. Although attempts were made to overcome the foregoing difficulties, none, as far as we are aware, was entirely successful when carried into practise commercially on an industrial scale.

It is thus one object of the invention to provide a method for the recovery of metal ion from a slurry containing the same. Other objects and advantages of the present invention will become apparent from the following description and claims.

Now the present invention will be explained in detail in conjunction with the sole figure of the attached drawing which diagrammatically shows one embodiment of the present invention.

In the figure, there are shown a treated liquid-passing vessel 1 (through which the liquid is treated as will be discussed hereinafter), a water-washing vessel 2 and a regenerating vessel 3. In a dissolving vessel 4, a small amount of metal component contained in a slurry (A) is dissolved by the addition of a suitable solvent (B). After sufficient stirring, a liquid in which the metal component is completely dissolved to provide the corresponding metal ion is obtained. In order to treat the liquid, it is continuously introduced at a predetermined rate into the liquid-passing vessel 1 at its bottom 6 by means of a circulation pump 5. The liquid-passing vessel 1 includes a stirrer consisting of a vertically suspended shaft 8 and blades 9 fixed thereto. This shaft is supported at its upper end on the top plate of the vessel 1 and it is driven by means of a motor 7. The liquid introduced through the bottom 6 upwardly passes through the liquid-passing vessel 1, while simultaneously it countercurrently contacts an ion exchange resin which is continuously fed at a predetermined rate through a hopper disposed on the top of the vessel 1 and which downwardly passes through the same vessel. Thus, the liquid to be treated is subjected to ion exchange reaction, with stirring, within the liquid-passing vessel 1 and is then overflown at the top of the vessel as shown by arrow $a$. In order to assure the uniform contact between the liquid and the resin, which will frequently be disturbed by the irregular flow of the resin or liquid due to the presence of sludgy mass in the slurry, the stirrer must be turned, but at a relatively low speed, such as 3 r.p.m.

The resin having been subjected to ion exchange reaction is passed to the top hopper 13 of the water-washing vessel 2 from a resin outlet opening 11 at the bottom of the liquid-passing vessel 1 by means of a water ejector 12. Since the resin coming from the vessel 1 is unavoidably accompanied with an appreciable amount of the slurry, it is washed in the vessel 2 into which washing water W is introduced through its bottom 14. The water-washed resin is passed through a resin outlet port 15 at the bottom of the vessel 2 to the top hopper 16 of the regenerating vessel 3 by head difference between the liquid levels in the water-washing and regenerating vessels. The washing water is overflown at the top of the vessel 2 to discharge (shown by arrow "$b$"). The resin passed to the top hopper 16 of the regenerating vessel 3 descends within the vessel 3 while simultaneously it contacts a regenerating agent introduced through the bottom 17 of the vessel 3, thereby ion exchange reaction is effected. The thus regenerated resin is passed from the resin outlet port 18 of the regenerating vessel to the top hopper 10 of the liquid-passing vessel 1 by means of a head difference between the liquid levels of both of these vessels. The above-mentioned process is continuously carried out, while ion exchange resin is cyclically used. The regenerating liquid having been used in the regenerating vessel contains desired metal ion and it is overflown at the top 19 of the vessel 3 to a purifying vessel 20 (shown by arrow "$c$") wherein a suitable purifying agent D is added to overflow regenerating liquid to keep desired material in water-soluble form and impure material in water-insoluble form. The thus treated regenerating liquid is passed into a settling vessel 22 by means of a pump 21 and combined therein with a flocculating agent E to assist the precipitation of impure material. At the top of this vessel 22, a solution F is recovered, and the residue G is exhausted from the bottom and then passed to the aforementioned dissolving vessel 4 to achieve exhaustive recovery.

Now the effect of the instant process will be detailed in connection with one embodiment of the present invention.

In the spinning step for the production of cuprammonium rayon, a large amount of water and sulfuric acid is used to produce regenerated fiber. In the ammoniacal and acidic waste liquids thereby resulting, copper is dissolved. In order to recover such copper, these waste liquids are neutralized to precipitate the copper and then the resulting precipitate is concentrated and purified to obtain the copper in the form of copper sulfate and tetramine copper sulfate, if a known method is employed. In this case, however, silica which dissolves in water or hemicellulose which comes into spinning water during the spinning step will amount to such a high concentration that it renders the complete recovery of the copper impossible in the terminal parts of the process for recovering copper.

In accordance with a method of the present invention, the required equipment is smaller than that for the filtration or settling method which has been heretofore known. In the aforementioned case, however, the difference in specific gravity between the liquid to be treated and the ion exchange resin is reduced by the presence of sludge resulting from silica, hemicellulose and the like, and hence the resin tends to overflow with the liquid to be treated at the top of the liquid-passing vessel. Therefore, water is supplied through the bottom of this vessel to dilute the sludge and to differentiate the resin and the liquid to be treated in specific gravity in order to avoid dissipation of the resin. The following example will serve to show the present invention in detail.

Into a dissolving vessel 4, waste water containing copper ion from the spinning step of cuprammonium rayon fiber is introduced. To the waste water (i.e., a liquid to be treated), 74% sulfuric acid is gradually added with stirring, thereby to effect complete dissolution of the metal. The thus resulting copper-containing weakly acidic liquid (pH 2–3; $CuSO_4$ 0.38% and $(NH_4)_2SO_4$ 1.0%) is passed upwardly through a liquid-passing vessel 1 at the flow rate of 4 m.³/hr., said vessel being packed with 1.2 m.³ of strongly acidic cation exchange resin (Dia ion SK#1, a product of Mitsubishi Kasei Co., Ltd.) which is pretreated to be ammonium type. While the liquid ascends within the vessel, it is subjected to ion exchange reaction with the resin which adsorbs copper and other metal ions. Through the resin outlet port 11 at the bottom of the vessel 1, a resin stream containing about 70% resin at the rate of 600 l./hr. is discharged and then passed into the hopper at the top of a water-washing vessel 2 filled with water. The resin containing the copper is downwardly passed through the vessel 2 and is simultaneously washed with water introduced through washing water inlet port 14 at the bottom of the same vessel, whereby impure materials accompanying the resin are removed. The thus water-washed resin is passed through the resin outlet port 15 to a hopper 16 at the upper part of the regenerating vessel 3 which has a capacity for 1.8 m.³ of the ion exchange resin containing the copper. In the regenerating vessel, the water-washed resin countercurrently contacts an aqueous solution of ammonium sulfate which is upwardly passed through an inlet port 17 at the bottom of the vessel 3, whereby it is regenerated to ammonium type. The thus regenerated resin is recycled at the rate of 600 l./hr. through the resin outlet port 18 to hopper 10 at the top of the liquid-passing vessel 1. The aforementioned procedures are repeated. The resin is cyclically used. The regenerated liquid is overflown at the top of the regenerating vessel into purifying vessel 20.

In the purifying vessel 20, the regenerating liquid C is combined with ammonia water with stirring, whereby copper ion becomes tetramine copper sulfate soluble in the alkaline solution while other metal ions such as iron precipitate. The total mixture is passed into a settling vessel 22 and combined therein with a suitable flocculating agent E (Separan AP 30, a product of Du Pont Co), while stirring slowly. While the formed precipitate deposits, the copper to be recovered is overflown as tetramine copper sulfate solution. The precipitate G is passed into dissolving vessel 4 to effect the complete recovery of copper.

Solutions in each of the steps for carrying out the invention in practice show the following composition on chemical analysis.

|  | Slurry | Regenerating liquid containing the desired ion | Tetramine copper sulfate solution |
|---|---|---|---|
|  | Percent | Percent | Percent |
| Cu | 0.1–0.2 | 0.1–0.2 | 0.1–0.2 |
| Fe | 0.07–0.14 | 0.02–0.04 | Trace |
| Al | 0.01 | 0.003 | Trace |
| $SiO_2$ | 0.5–1.0 | 0.007 | Trace |
| Cellulose | 0.5 | 0.001 | Trace |

What I claim is:

A continuous method for the recovery of copper from a slurry containing copper, and other metals and a sludgy mass of silica and hemi-cellulose resulting from the spinning process in the production of cuprammonium rayon fiber, said method comprising adding concentrated sulfuric acid to the slurry in an amount such that the copper and other metals are completely dissolved in the slurry as sulfates, continuously feeding said slurry upwardly into a liquid passing vessel in countercurrent with a downwardly passing cation exchange resin in the ammonium form while discharging slurry which has been contacted with said resin and discharging resin which has adsorbed the metals as ions, stirring the slurry and the resin in the liquid passing vessel at a uniform succession of horizontal levels at a relatively slow speed to establish uniform contact between the slurry and the resin in spite of irregular flow thereof due to the presence of said sludgy mass in the slurry, passing the regenerated resin through a water-washing vessel to wash the resin, conveying the washed resin to a regenerating vessel in which the resin is regenerated by countercurrent contact with an ammonium sulfate solution, recycling the regenerated resin to the liquid passing vessel, and recovering copper from the liquid discharged from the regenerating vessel by adding an aqueous ammonia solution to the latter liquid to form water-soluble tetramine copper sulfate and a precipitate of metal ions other than copper, after which the solution containing the tetramine copper sulfate is separated.

References Cited by the Examiner

UNITED STATES PATENTS

| 2,061,194 | 11/36 | Gulbrandsen | 23—125 |
| 2,206,889 | 7/40 | Gulbrandsen | 23—125 |
| 2,271,482 | 1/42 | Hoelkeskamp et al. | 23—55 |
| 2,288,547 | 6/42 | Pattock et al. | 23—50 |
| 2,557,910 | 6/51 | Green | 23—260 |
| 2,962,361 | 11/60 | Spiller et al. | 23—260 |
| 2,993,782 | 7/61 | Hampton et al. | 23—50 X |
| 3,003,866 | 10/61 | Mattano et al. | 23—50 X |

MAURICE A. BRINDISI, *Primary Examiner.*